Figure 1:
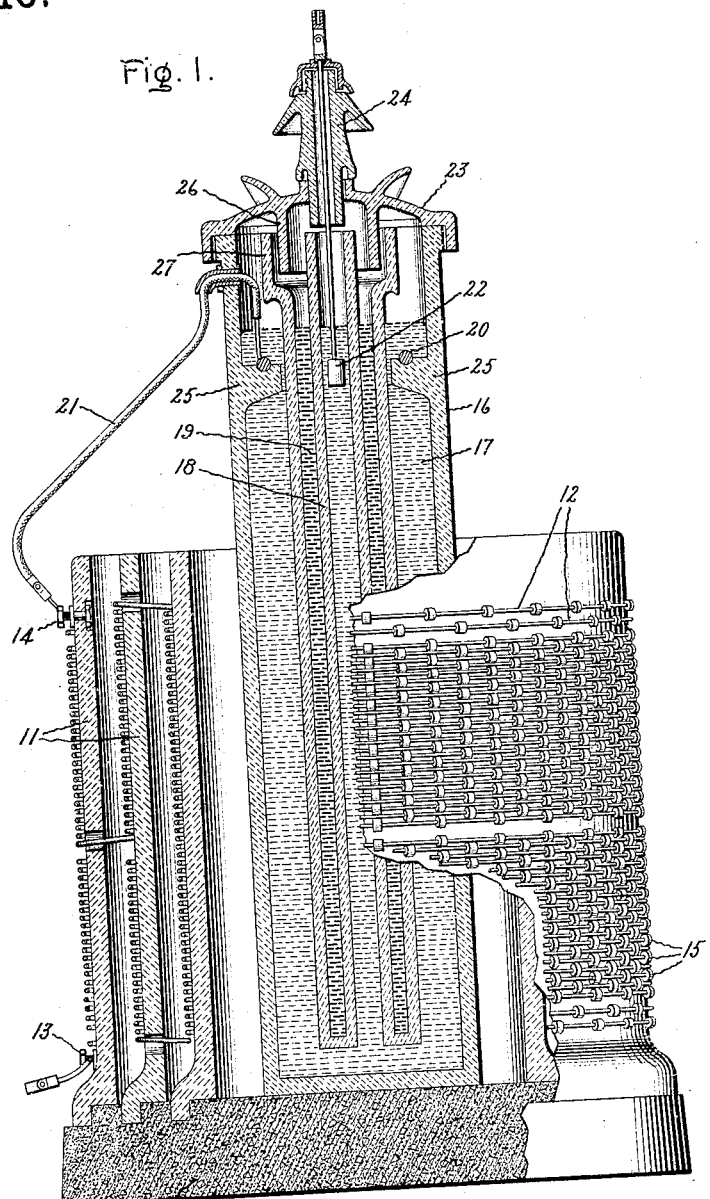

J. J. FRANK.
PROTECTIVE DEVICE.
APPLICATION FILED OCT. 19, 1915.

1,190,140.

Patented July 4, 1916.

Inventor:
John J. Frank,
by Albert G. Davis
His Attorney.

UNITED STATES PATENT OFFICE.

JOHN J. FRANK, OF PITTSFIELD, MASSACHUSETTS, ASSIGNOR TO GENERAL ELECTRIC COMPANY, A CORPORATION OF NEW YORK.

PROTECTIVE DEVICE.

1,190,140.  Specification of Letters Patent.  Patented July 4, 1916.

Original application filed June 16, 1913, Serial No. 772,161. Divided and this application filed October 19, 1915. Serial No. 56,791.

*To all whom it may concern:*

Be it known that I, JOHN J. FRANK, a citizen of the United States, residing at Pittsfield, county of Berkshire, State of Massachusetts, have invented certain new and useful Improvements in Protective Devices, of which the following is a specification.

The present application is a division of my application, Serial No. 772,161, filed June 16, 1913.

My invention relates to protective devices for electrical installations, and in particular to devices for protecting electrical apparatus, such as transformers, included in a high voltage electrical transmission system.

More specifically, my invention relates to that type of protective device described in the application for United States Letters Patent of Dr. Charles P. Steinmetz, filed June 19, 1913, Serial No. 774,513.

The patent application above mentioned describes a protective device selective in its action and permitting a non-oscillatory flow of high frequency current coming from one direction but reflecting back toward the source high frequency current coming from the other direction. The device is adapted to be employed in an electrical installation, comprising two sections, each section having distributed resistance, inductance and capacity, and consists of an inductance included in series relation with the installation and shunted by a resistance whose ohmic value is approximately equal to the ohmic value of the surge resistance of that section of the installation to be protected. As explained in the above mentioned patent application, such a protective device permits the non-oscillatory exit of high frequency disturbances arising within the section of the installation to be protected and reflects back toward the source high frequency disturbances arising in the other section.

The object of my invention is to provide a novel construction and arrangement of apparatus particularly adapted to perform the functions of the protective device above described.

More generally, the object of my invention is to provide a novel and compact arrangement of inductive winding and a non-inductive winding in a single unitary structure.

A further object of my invention is to provide a non-inductive resistance of novel and improved construction.

The features of my invention which I believe to be novel and patentable are definitely indicated in the claims appended hereto.

Figure 2:
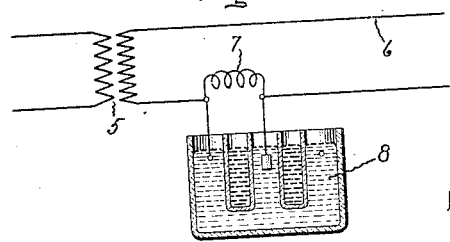

The construction and arrangement of apparatus in a protective device embodying the novel features of my invention will be understood from the following description taken in connection with the accompanying drawings, in which:

Figure 1 is an elevation partly in section of a protective device embodying my invention, and Fig. 2 is a diagrammatic representation of my protective device operatively connected in an electrical installation.

Referring first to Fig. 2 of the drawings, it will be observed that my protective device is arranged to protect the windings of a transformer 5. This transformer is included in an electrical installation and has its high potential winding connected to transmission conductors 6. Translating devices of any desired character may be connected to the transmission conductors 6. Such devices have been omitted in the drawings in order to simplify the showing.

An inductive winding 7 is included in series relation with one of the transmission conductors, and this winding is shunted by a non-inductive resistance 8. The ohmic value of the non-inductive resistance 8 is approximately equal to the ohmic value of the surge resistance of the transformer 5. As explained in the hereinbefore mentioned patent application of Dr. Steinmetz, the ohmic value of the surge resistance of the transformer is equal to $\sqrt{\frac{L}{C}}$, where L and C represent in henries and farads the inductance and capacity respectively of the transformer. As the surge resistance of the transformer is many times greater than the surge resistance of the transmission conductors, the protective device comprising the inductance 7 and non-inductive resistance 8 will act to permit the non-oscillatory exit of any high frequency disturbance arising within the transformer and to reflect back toward the source any high frequency disturbance arising without the transformer. It will of course be understood that I may insert a protective device in each transmission conductor if desired.

The resistance 8 should have substantially no inductance and to this end I have found it most desirable to employ a liquid resistance. The combination of a liquid resistance in a protective device of the type herein described, I consider to be an important feature of my invention. I have furthermore devised a novel construction of liquid rheostat which is peculiarly adapted to perform the functions of the resistance in the protective device to which my invention relates. The details of construction of this liquid rheostat will be understood from the following description.

In Fig. 1 of the drawings, I have illustrated a protective device of unitary construction embodying the inductance 7 and resistance 8 of Fig. 2. This protective device comprises a supporting base 10 of insulating material upon which are mounted concentric cylinders 11 also of insulating material. Preferably I construct the cylinders 11 of concrete or other stone-ware material. The inductance comprises a winding of bare copper wire 12, wound upon the cylinders 11. The terminals of this inductive winding are indicated at 13 and 14 respectively. Porcelain sleeves 15 are mounted on the wire 12 and serve to space the turns of the winding from each other and also to space the wire conductors from the supporting cylinders.

A liquid containing vessel 16 is arranged within the inner cylinder 11 and rests upon the supporting base 10. This vessel contains a liquid electrolyte 17 which serves as the resistance material of the liquid resistance. Preferably the electrolyte consists of a mixture of water, salt and glycerin, the salt being added to obtain a certain ohmic value of the liquid, and the glycerin being added to prevent the mixture from freezing at low temperature.

A tubular member 18 is mounted within the vessel 16 and serves to divide the electrolyte in the vessel into two portions. The bottom of the tubular member does not reach to the bottom of the vessel, and the electrolyte at the bottom of the vessel therefore serves to electrically connect the portions of the electrolyte divided by the tubular member. The vessel 16 and tubular member 18 are preferably of stone-ware material. The dielectric strength of this material is not very great, and I have accordingly found it desirable to provide another insulating material between the two portions of electrolyte. This I accomplish by providing the tubular member with a double wall forming a liquid containing chamber. Insulating liquid 19, such as oil, is inserted in this chamber.

An electrode 20 is supported on inwardly projecting shoulders 25 near the top of the vessel 16 and extends into the electrolyte between the vessel and the tubular member, thus constituting one terminal of the liquid resistance. This electrode is connected to the terminal 14 of the inductance by means of a conductor 21. An adjustable electrode 22 extends into the electrolyte within the tubular member 18 and constitutes the other terminal of the liquid resistance. This electrode is adapted to be connected to the terminal 13 of the inductance.

It will be seen that the tubular member 18 provides a plurality of paths for the flow of current through the electrolyte. If the current is assumed to enter at the electrode 20, it will flow downwardly in that portion of the electrolyte surrounding the tubular member to the bottom of this member, and then upwardly through that portion of the electrolyte within the tubular member. The layer of insulating liquid supported by the double wall construction of the tubular member insulates the portion of the electrolyte within the tubular member from the electrolyte surrounding the tubular member, except at the bottom of the tubular member where these two portions of electrolyte are electrically connected.

The top of the vessel 16 is closed by a cover of stone-ware material 23. The electrode 22 is supported by an insulating cap 24 which rests upon the cover 23. The upper portion 27 of the outer wall of the tubular member is of increased diameter and into the space between the two walls of this member a downwardly projecting baffle plate 26 extends. This plate is supported by the cover 23 and may be made integral therewith.

What I claim as new and desire to secure by Letters Patent of the United States, is:—

1. A liquid resistance comprising in combination a liquid containing vessel, an electrolyte within said vessel, means within said vessel for providing a plurality of electrically connected paths for the flow of current through said electrolyte, and liquid insulating means for confining the flow of current from one path to another to the point of electrical connection between the paths.

2. A liquid resistance comprising in combination a liquid containing vessel, an electrolyte within said vessel, a layer of liquid insulating material suitably supported within said vessel and dividing the electrolyte therein into two electrically connected portions, and an electrode extending into each portion of said electrolyte.

3. A liquid resistance comprising in combination a liquid containing vessel, an electrolyte within said vessel, an insulating layer of oil suitably supported within said vessel and dividing the electrolyte therein into two electrically connected portions and an electrode extending into each portion of said electrolyte.

4. A liquid resistance comprising in combination a liquid containing vessel, an electrolyte within said vessel, a member mounted within said vessel and dividing the electrolyte therein into two electrically connected portions, an electrode extending into each portion of said electrolyte, and liquid insulating material coöperating with said member for insulating said portions of electrolyte.

5. A liquid resistance comprising in combination a liquid containing vessel, an electrolyte within said vessel, electrodes extending into said electrolyte near the surface thereof and constituting terminals for said rheostat, means within said vessel for directing the flow of current from one electrode toward the bottom of said vessel and thence toward the top of said vessel to said other electrode, and liquid insulating means for insulating the path of downward flow of the current from the path of upward flow of the current.

6. A liquid resistance comprising in combination a liquid containing vessel, an electrolyte within said vessel, a tubular member arranged within said vessel, an electrode extending within said electrolyte between the vessel and the tubular member, a second electrode extending into the electrolyte within said tubular member, and liquid insulating material supported by said tubular member for insulating the portion of the electrolyte within the tubular member from the electrolyte surrounding the tubular member.

7. A liquid resistance comprising in combination a liquid containing vessel, an electrolyte within said vessel, a tubular member having a surrounding liquid containing chamber mounted within said vessel, an insulating liquid in said chamber, an electrode extending into the electrolyte between the vessel and the tubular member, and a second electrode arranged to extend into the electrolyte within said tubular member.

In witness whereof, I have hereunto set my hand this 15th day of October, 1915.

JOHN J. FRANK.